United States Patent [19]

Ohshiro et al.

[11] Patent Number: 6,025,081
[45] Date of Patent: Feb. 15, 2000

[54] COPPER-BASED BEARING MATERIAL AND SLIDING BEARING FOR INTERNAL COMBUSTION ENGINES

[75] Inventors: Haruyuki Ohshiro; Takashi Tomikawa; Katsuyuki Hashizume; Soji Kamiya, all of Aichi, Japan

[73] Assignee: Taiho Kogyo Co., Ltd., Toyota, Japan

[21] Appl. No.: 08/860,441

[22] PCT Filed: Oct. 25, 1996

[86] PCT No.: PCT/JP96/03118

§ 371 Date: Jan. 8, 1998

§ 102(e) Date: Jan. 8, 1998

[87] PCT Pub. No.: WO97/15695

PCT Pub. Date: May 1, 1997

[30] Foreign Application Priority Data

Oct. 27, 1995 [JP] Japan ................................ 7-303936

[51] Int. Cl.[7] .............................. C22C 9/02; F16C 33/12
[52] U.S. Cl. .......................... 428/644; 428/674; 384/912; 420/470; 420/472; 420/474; 420/497
[58] Field of Search .................................. 428/553, 554, 428/555, 647, 644, 645, 674, 677, 675, 626; 420/470, 472, 497, 474, 499, 490; 75/247; 384/912

[56] References Cited

U.S. PATENT DOCUMENTS

| | | |
|---|---|---|
| 4,551,395 | 11/1985 | Lloyd . |
| 4,877,696 | 10/1989 | Muto ........................................ 428/645 |
| 5,066,456 | 11/1991 | Ballentine et al. ..................... 420/472 |
| 5,820,701 | 10/1998 | Bhargava ................................ 420/472 |
| 5,832,360 | 11/1998 | Andrews et al. ....................... 428/553 |

FOREIGN PATENT DOCUMENTS

| | | |
|---|---|---|
| 36-13058 | of 0000 | Japan . |
| 57-94501 | 6/1982 | Japan . |
| 64-58812 | 3/1989 | Japan . |
| 2-228439 | 9/1990 | Japan . |

*Primary Examiner*—John J. Zimmerman
*Attorney, Agent, or Firm*—Armstrong, Westerman, Hattori, McLeland & Naughton

[57] ABSTRACT

The copper-based sliding material has improved seizure resistance, even if it is free of Pb, and enables thinning of the overlay. The copper alloy provided consists of from 0.1 to 2% of Ag, from 1 to 10% of Sn, and the balance consisting of Cu and unavoidable impurities and, further said Ag and Sn do not essentially form the secondary phases but are in complete or essentially solid-solution state in the Cu matrix.

30 Claims, 3 Drawing Sheets

SCHEMATIC DRAWING OF TESTER

SCHEMATIC DRAWING OF SEIZURE TESTER

1

COPPER-BASED BEARING MATERIAL AND SLIDING BEARING FOR INTERNAL COMBUSTION ENGINES

This is the national stage of PCT/JP96/03118 filed on Oct. 25, 1996.

TECHNICAL FIELD

The present invention relates to copper-based sliding bearing material and sliding-bearing material for internal combustion engine. More particularly, the present invention relates to a copper-based sliding-bearing material having novel composition and structure, and used for the bearings of internal combustion engines, such as the main bearings of the engine and connecting-rod bearings, as well as the sliding bearings, such as the main bearings of an engine and connecting-rod bearings, for which the above material is used.

BACKGROUND TECHNIQUE

Heretofore, the general sliding bearings of an internal combustion engine are, as is described in Japanese Unexamined Patent Publication (Kolai) No. Sho 60-145,345, provided by sintering a copper-alloy, i.e., the so-called lining, which consists of from approximately 8 to 35% of Pb, not more than approximately 10% of Sn, and the balance consisting of Cu, on a strip consisting of low-carbon steel, such as SAE 1010 and 1020.

Furthermore, as is described in detail in Japanese Patent Divulgation (Kohyo) No. Hei 1-503,150, Sn diffuses into the lining of a bearing structure with a Pb—Sn based or Pb—Sn—Cu based overlay on the lining, with the result that Sn is so depleted in the overlay as to drastically deteriorate the corrosion resistance against the lubricating oil. An Ni barrier has, therefore, been sandwiched by plating between the lining and the overlay. The proposal in the publication mentioned above as a countermeasure against the corrosion attributable to lead resides in the refinement of the lead phases.

The lead, which is contained in the conventional overlay-fitted kelmet bearing, is a soft metal and has an excellent sliding property and conformability. Therefore, lead, which realises the conformability, has been used for the purpose of preventing the seizure due to adhesion of Cu.

When the conventional sliding bearing is used in degraded lubricating oil for extended periods of time, and the lining is then exposed, the lead phases of the lining are corroded and dissolved, thereby roughening the lining surface and hence leading to seizure. Alternatively, since the lead phases are dissolved out, thus forming pores, the strength of the lining is lowered, leading to collapses of the lining, thereby incurring seizure. A measure to refine the lead phases has been undertaken to mitigate the corrosion of lead phases. However, this measure involves limitations arising from the use of lead insofar as the sliding bearing materials contain lead.

In addition, when the conventional sliding bearing is used in degraded lubricating oil for extended periods of time, copper reacts with the sulfur (S) in the lubricating oil and is sulfurized to form copper sulfide on the lining surface. As a result, the corrosion resistance and wear resistance detrimentally deteriorate. As a measure against this deterioration, Zn addition is implemented. However, the addition of Zn virtually has no effect on enhancement of the seizure resistance.

Furthermore, the conventional overlay is 20 μm or more thick so as to not only provide conformability with the shaft but also to exhibit the sliding-bearing performances, such as seizure resistance, due to the overlay itself. It is, however, needless to say that thick plating should be avoided from the point of view of the cost of sliding-bearing materials.

There is a problem from another point of view. That is, although the conventional nickel barrier must be used for preventing the Sn diffusion, when the nickel barrier is exposed due to the wear of overlay, seizure becomes extremely liable to occur on the exposed hard Ni portions. This result has been occasionally judged to be the life of a bearing. Although such problems of the Ni barrier have been pointed out heretofore, it can be said that the use an Ni barrier is inevitable for preventing the tin diffusion.

DISCLOSURE OF INVENTION

The present invention provides a copper-based sliding bearing material and sliding bearing for internal combustion engine which can solve the above-described various problems.

The present first invention is a copper-based sliding bearing material having improved seizure resistance, characterized in that it consists, by weight percentage, of from 0.1 to 2% of Ag, from 1 to 10% of Sn, and the balance consisting of Cu and unavoidable impurities and, further, said Ag and Sn do not essentially form the secondary phases but are in a complete or essentially solid-solution state in the Cu matrix.

The present second invention is a sliding bearing for the internal combustion engine which comprises the above-mentioned copper-based sliding material and an overlay of from 1 to 25 μm thickness which consists of soft metal or solid lubricant and resin.

The present third invention is a sliding bearing for the internal combustion engine, in which the above-mentioned overlay is directly bonded on the above mentioned sliding-bearing material without intermediary of an intermediate layer.

The constitution of the present invention is described hereinafter. First, the alloy composition of the sliding bearing material according to the present invention is described.

Ag, which is contained in the copper-based alloy, is dispersed uniformly and finely in the Cu matrix, thereby enhancing the seizure resistance. In any case that the Ag content is less than 0.1% or exceeds 2%, no effect of enhancing the seizure resistance is attained. The preferable Ag content is from 0.4 to 1%.

Next, the solute Sn enhances the hardness and strength of the Cu matrix and also improves the corrosion resistance and adhesion resistance. When the Sn content is less than 1%, no improving effect of adhesion resistance is attained. On the other hand, when the Sn content exceeds 10%, the copper-based alloy becomes too hardened and its conformability as a bearing becomes poor. In addition, precipitation of $Cu_3Sn$ compound (ε phase) starts to impair the seizure resistance. Preferable Sn content is from 2 to 7%.

Not more than 0.5% of P may be further added to the above mentioned composition. Although P in itself does not particularly contribute to the sliding properties, it acts as a deoxidizing agent and improves the melt flowability at the powder atomizing. The properties of the powder are, therefore, improved. P enables sintering at a relatively low temperature as well. In addition, P exerts an effect as the deoxidizing agent in the production of cast material and improves the melt flowability, thereby lessening casting defects. The amount of solute oxygen, which may impede the precipitation of Ag and Sn during use of a bearing, is decreased by the P addition. The amount of Sn and Ag maintained at the solute state is so increased by the P addition as to improve the seizure resistance. The P addition is, therefore, preferable in a case where the oxygen amount in the copper alloy is large. However, when the P content exceeds 0.5%, the copper alloy becomes hard and embrittled. The preferable P content is from 0.05 to 0.15%.

The particularly preferable composition is Cu-1% Ag-5% Sn, the Ag and Sn contents of which exceed the solid-solubility limits under the equilibrium state. The alloy, in which these elements are forcedly solid-dissolved, exhibits markedly improved sliding properties.

The elements other than the above-mentioned ones are such impurities as O, Fe, As and Ni ordinarily contained in the copper. The lower the contents of these elements, the better. Particularly, the oxygen involves a danger of impeding the precipitation of the forcedly solid-dissolved Ag (c.f. FIG. 3 described later). Pb brings about the corrosion by the S component in the lubricating oil. Therefore, the less O and Pb, the better. Since the other elements bring about no advantageous effects, it is preferable to control to approximately 1% or less in total. It is to be particularly noted that, although Pb, which is soft metal, is not contained as an essential element, in the copper-based alloy according to the present invention, Cu does not adhere on the opposite material and has markedly improved sliding properties. However, not more than 4% of Pb and Bi may be added to the copper-based alloy in order to impart free cutting property.

Subsequently, the structure of the copper alloy according to the present invention is described.

In the present Cu—Sn—Ag based alloy, the solid-solubility limits under the equilibrium state is approximately 2% for Sn and approximately 0.2% for Ag. The alloy composition of the present invention extends, therefore, over a range less and more than the solid-solubility limits of these elements.

It is important for improving the sliding properties that these elements are solid-dissolved in the Cu matrix and are finely dispersed within the detection level of an electron microscope. The complete solid-solution structure in the present invention means that an electron microscope does not detect any presence of the secondary phases and, further, EPMA does not detect any concentration of Cu, Sn, Ag and P resulting in the formation of the secondary phases such as Ag, $\epsilon$-$CuSn_x$ ($Cu_3Sn$), and 5-CuSn ($Cu_6Sn_5$). It is required in the present invention that such principal components as Cu, Sn and Ag do not form the secondary phases, while the impurities may form inclusions or secondary phases in a trace amount without causing any in convenience.

In the present invention, the solid-solution state is desirably a complete one but may be an essential one, in which the secondary phases are virtually not detected. Specifically, the essential solid solution state herein indicates that, when an X-ray image photograph of the respective elements such as Ag are observed by an image analyzing device, the secondary phase is 5 area % or less at an optional observation field (magnification of 1000 times).

As is described in detail hereinbelow, Ag is concentrated on the bearing surface during the use of a bearing and forms an Ag—S compound. This phenomenon seems to be a reason why the sliding properties of the sliding-bearing material according to the present invention are outstandingly improved. Since it is the above mentioned solid solution state of the Cu matrix that enables the formation of an Ag—S compound, the solid solution state should be detected in the lining except for the uppermost surface. In addition, since the solid-solution state is a necessary condition for improving the sliding properties during use of a bearing, the solid solution state should be realized in a shallow region of a bearing, where the wear of a bearing is likely to occur, that is, approximately 1 $\mu$m deep from the surface. Ag and the like may be precipitated in the material interior, where the cooling rate becomes slow due to the mass effect when the material is rapidly cooled. This is to be made clear in the description hereinafter.

It is necessary for solid-dissolving the Ag and Sn into the Cu matrix that the sintering is carried out at preferably from 800 to 900° C., followed by rapid cooling at a cooling rate of 50° C./minute or higher, or the solution heat-treatment is carried out under the same conditions. These elements should, thus, be forcedly dissolved in the Cu matrix.

In the case of cast materials, the melt is blown, within $N_2$ atmosphere, onto an approximately 1.5 mm thick steel sheet (SPCC) which has been preliminarily heated to approximately 500 to 600° C. Subsequently, the steel sheet is preferably water-cooled from the back side at a cooling rate of 100° C./second or more.

As is described hereinabove, the Ag and Sn contents are occasionally less than the solid-solubility limits under the equilibrium state. Rapid cooling is desirable as well so as to prevent segregation of the elements.

Subsequently, the sliding bearing, in which the sliding-bearing material according to the present invention is used, is described. This sliding-bearing material can be used in every known form, such as an overlay-utilizing form, as conventionally. Particularly useful methods for using the sliding-bearing material having very excellent sliding properties according to the present invention are as follows.

Since the sliding-bearing material according to the present invention need not be supplementarily reinforced by a thick overlay, as in the case of conventional material, the thickness of the overlay may be of such a level as required for providing conformability with a shaft, that is, from 1 to 25 $\mu$m, preferably from 2 to 8 $\mu$m.

Various metallic overlays, such as Pb—In, Pb—Sn—Cu, Pb—Sn—In, Pb—Sn—In—Cu based alloy plating, Sn-based plating, and In-based plating can be used. In addition, an overlay, in which the solid lubricant such as $MoS_2$ is bonded with resin binder such as polyimide (PI), polyamide imide (PAI), epoxy resin and the like, can be used.

As is described hereinabove, there occurs during use of a bearing a phenomenon such that the Sn contained in the overlay diffuses into the lining. Since the overlay may merely have the function to provide conformability in the present invention, the performance of the overlay need not be maintained for such a long period of time that the Sn is depleted. From this point of view, the nickel barrier becomes unnecessary. Furthermore, by means of positively omitting the nickel barrier, the seizure due to the exposed nickel barrier can be prevented, and excellent seizure resistance of the exposed lining can even be utilized. In such sliding bearing, the surface of the copper-based sliding-bearing material may be treated by etching, shot blasting, plating and the like for enhancing adhesion of the overlay.

Phenomena, which are recognized when the copper-based material according to the present invention (1) and the comparative copper-based material (2) are used as a bearing, include the following. (a) The solute Ag in the matrix precipitates on the sliding surface during use of a bearing (temperature: 120–180° C.) and are reacted with the S component in the lubricating oil to form an extremely thin film of $Ag_2S$ which is an Ag—S compound (1). (b) Precipitation of Ag is not detected in the lining interior 1 μm or more under the sliding surface (1). (c) The Ag precipitated from the initial period of use of a bearing is too hard and has poor sliding properties. The above mentioned $Ag_2S$ film is not formed widely and uniformly and the sliding properties are, therefore, not improved (2). (d) Even when the Ag content is less than the solid-solubility limit, the phenomenon (a) occurs (1).

BEST MODE FOR CARRYING OUT THE INVENTION

Figure 1:
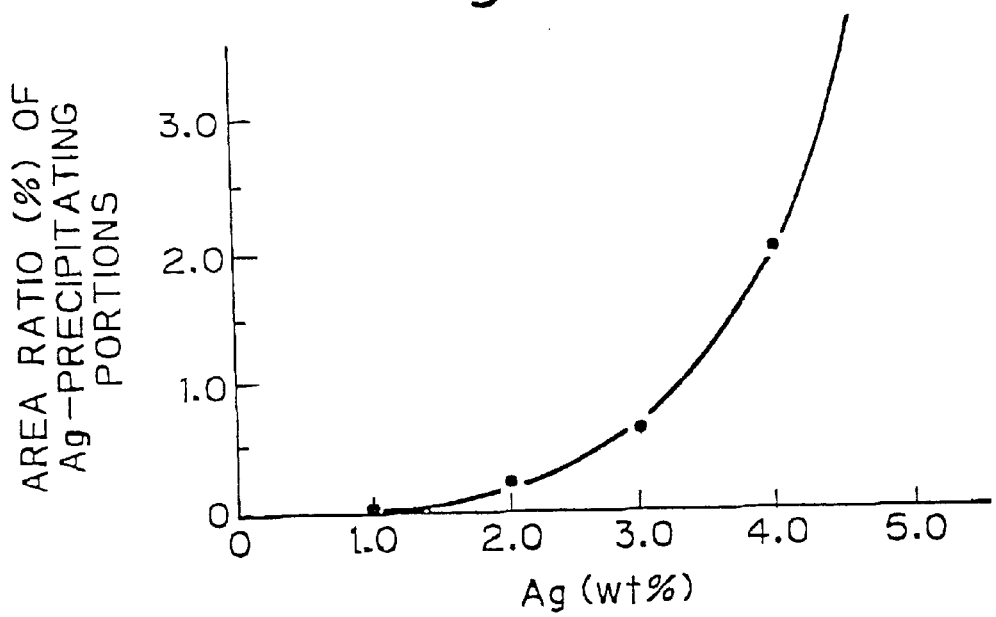
FIG. 1 is a graph showing the relationship between the Ag content and the area ratio of the Ag-precipitating portions.
Figure 2:
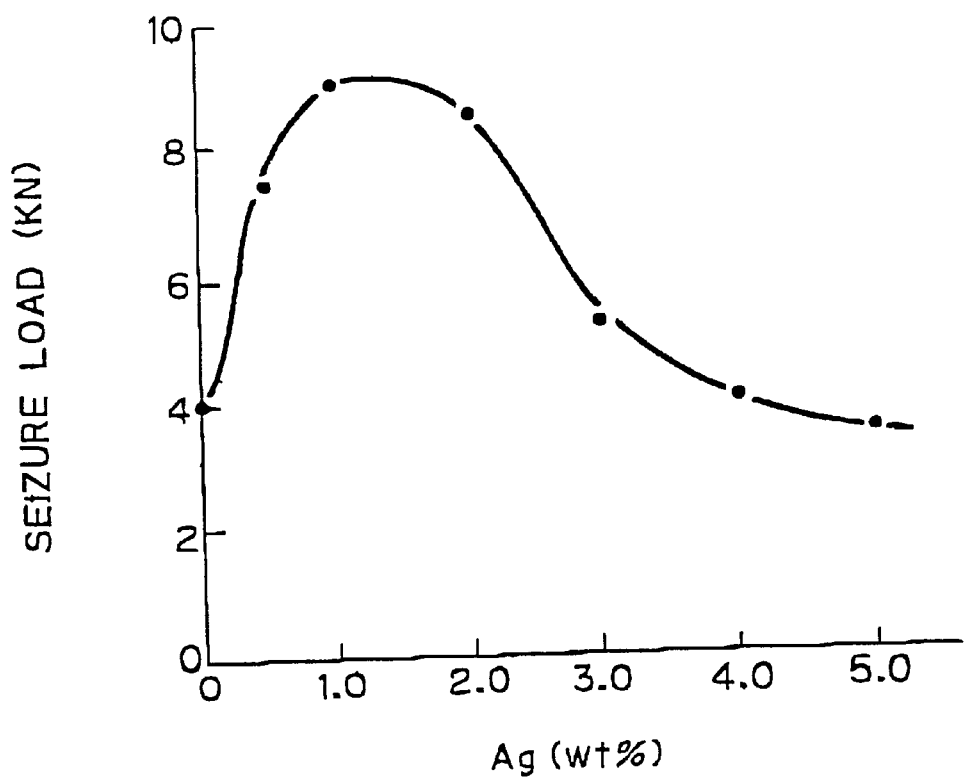
FIG. 2 is a graph indicating the relationship between the Ag content and the seizure load.
Figure 3:
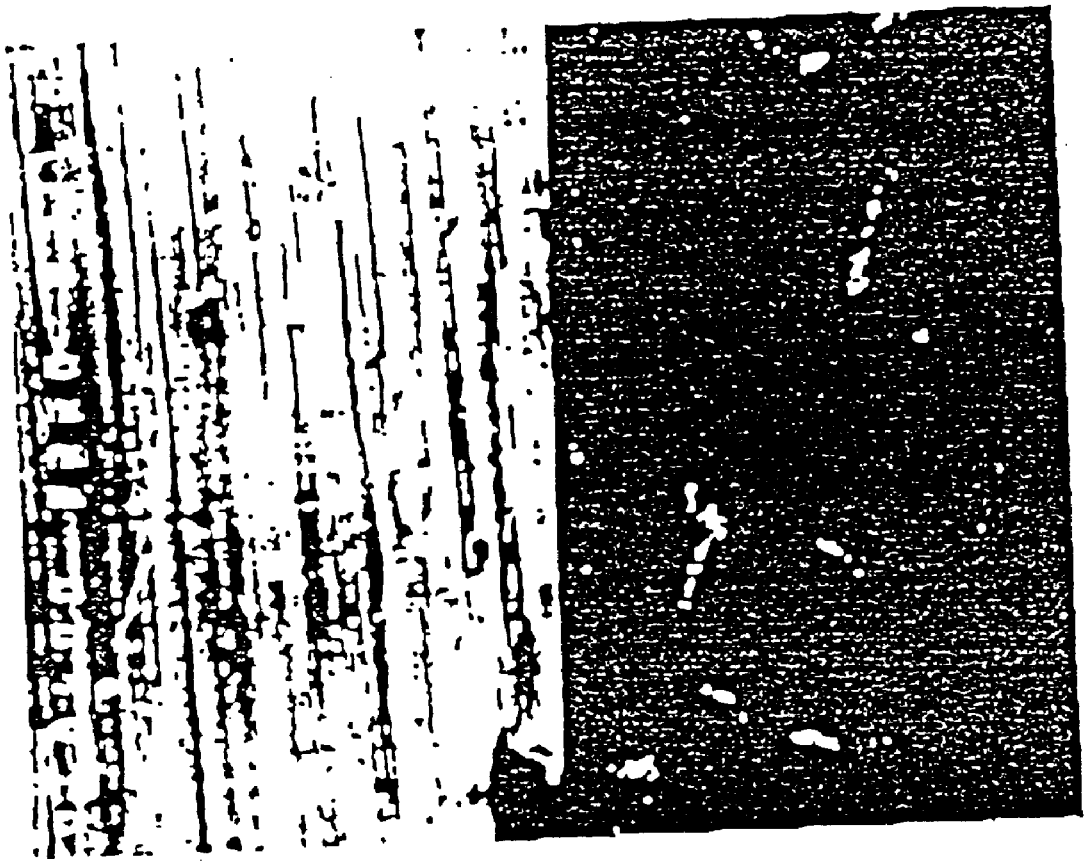
FIG. 3 is an SEM image of Ag of the copper-based material containing 4% of Ag.

Sintered materials, with a composition of Sn=5%, P=0.05%, Ag≦5%, the balance of Cu, was produced by the same method as in Example 1 described hereinbelow. The Ag precipitating area ratio was measured in five fields before using as a bearing. The result is shown in FIG. 1. The seizure load of these materials are shown in FIG. 2. In FIG. 3 is shown an SEM image of Ag (magnification of 1000 times) for a composition of Ag=4% and Ag-precipitating are a ratio=4%. The following facts are revealed from FIGS. 1 and 2. (a) Ag is in completely solid-solution at 1% or less. The seizure load outstandingly increases with the increase in the Ag content in a completely solid-solution state of Ag. (b) When the Ag content exceeds 1.0%, the forced solid-solution becomes impossible, and the Ag precipitation starts. Along with this, the seizure load gradually decreases. (c) At the upper limit of Ag, i.e., 2%, 1% of Ag is present as a solute, while the residual 1% of Ag is present as the secondary phase. Even if the structure is under such a state, the seizure load is maintained at a very high level due to the effect of solute Ag.

FIG. 3 shows one example of precipitation morphology of the Ag secondary phase.

Meanwhile, Sn also improves the seizure resistance, provided that it is a solute element of the Cu matrix. When Sn precipitates as the secondary phase before the use of a bearing, hardening and embrittlement occurs so that the sliding properties are impaired. The copper-based alloy having the inventive characterizing structure contains a solute Sn, which then precipitates on the sliding surface during use of a bearing. Furthermore, Ag is also together precipitated in a precipitation site of Sn. Such compounds as $Ag_2S$, $Ag_3Sn$, SnS and the like are, therefore, formed as the secondary phases on the sliding surface. Presumably, these compounds improve the sliding properties.

The present invention is described more in detail by way of examples.

EXAMPLE 1

Figure 4:
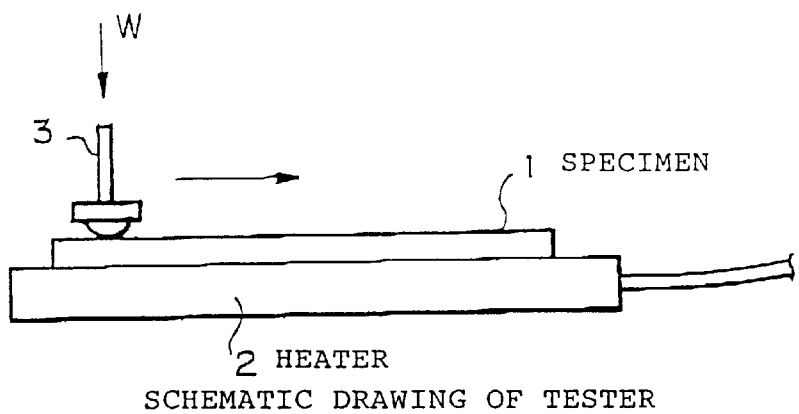
FIG. 4 shows a stick-slip tester.

The alloy melt having the composition shown in Table 1 was pulverized by atomizing. The powder, particle size of which is 150 μm, was dispersed on a backing steel sheet (SPCC, thickness=1.4 mm) to a thickness of approximately 0.6 mm. The powder was sintered at 850° C. in a hydrogen gas atmosphere, without compression. Rapid cooling was subsequently carried out at a cooling rate of 50° C./minute. Subsequently, the sintered layer was compressed to reduce the entire thickness to 1.5 mm. The surface of the sintered material was polished to obtain roughness of 0.5 μm. The so-prepared specimens (thickness of 1.5 mm) were subjected to the stick-slip test. The testing method is illustrated in FIG. 4 and is pertinent for examination of the tendency of seizure occurrence due to adhesion. In FIG. 4, 1 is a testing specimen, 2 is a heater, and 3 is a steel ball being displaced on the specimen surface while imparting the load. The testing conditions were as follows.

(a) Load (W): 500 g (b) Radius of steel ball at its tip end: 4 mm (c) Displacing speed of steel ball: 3.6 mm/min (d) Displacing distance of steel ball: 20 mm (e) Highest heating temperature by heater: 200° C.

(f) Measurement of adhered area of copper: by the surface photograph of steel-ball surface The results of the stick-slip test are shown in Table 1.

TABLE 1

| | | Composition (wt/%) | | | | | Occurring Time of Stick Slip | | |
|---|---|---|---|---|---|---|---|---|---|
| | No. | Cu | Ag | Sn | Pb | P | Occuring Temperature (° C.) | Coefficient of Friction | Cu Adhered Area (μm²) |
| Examples | 1 | Bal | 0.5 | 5 | — | 0.03 | None | — | 0 |
| | 2 | Bal | 1.0 | 3 | — | — | None | — | 0 |
| | 3 | Bal | 1.5 | 7 | — | 0.05 | None | — | 0 |
| | 4 | Bal | 2.0 | 10 | — | 0.08 | None | — | 0 |
| | 5 | Bal | 0.1 | 1 | — | — | None | — | 0 |
| Comparative Examples | 6 | Bal | — | — | — | — | 100 | 0.40 | 2000 |
| | 7 | Bal | 0.05 | — | — | 0.1 | 120 | 0.42 | 1700 |
| | 8 | Bal | — | 5 | — | 0.05 | 150 | 0.50 | 1500 |
| | 9 | Bal | — | 3 | 10 | 0.02 | None | — | 0 |
| | 10 | Bal | 0.01 | 15 | — | 0.03 | 160 | 0.55 | 900 |

In Table 1, Comparative Example No. 6 is pure copper. In this comparative example, the copper adhesion area of a specimen is large, and the adhesion of a specimen occurs at a low temperature. In Comparative Example 7 with addition of Ag and P in a small amount, the adhesion tendency is somewhat suppressed. When Sn is added in a large amount (Comparative Examples 8 and 10), the adhesion tendency is furthermore suppressed. When Pb and Sn are added in combination (Comparative Example No. 9), the adhesion is completely suppressed. Contrary to this, the adhesion is completely suppressed in the inventive Examples 1 through 5 even without addition of Pb.

EXAMPLE 2

Figure 5:
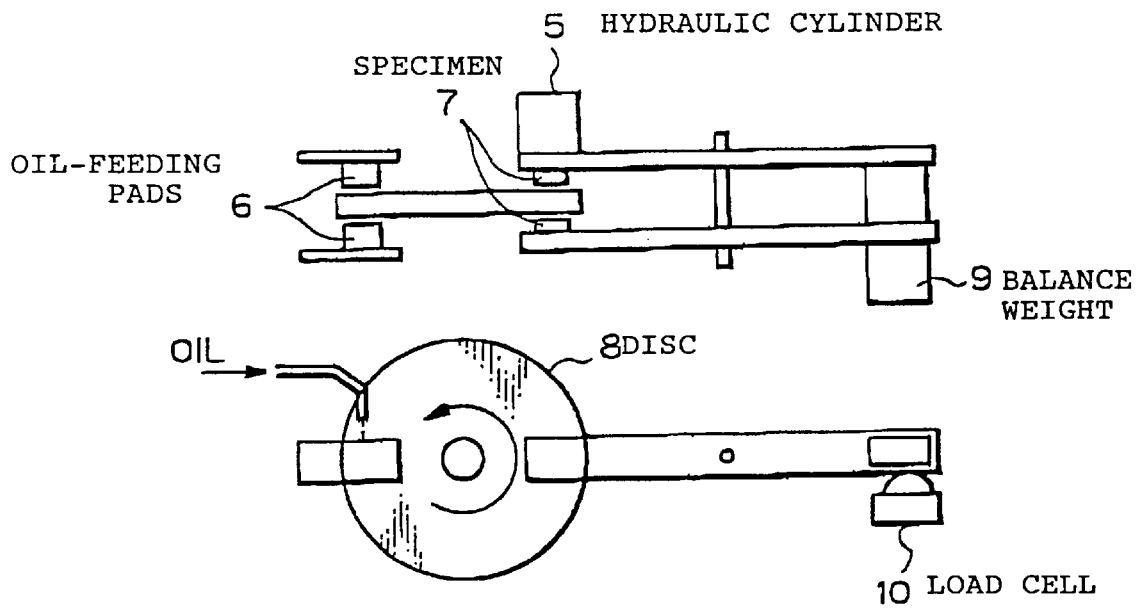
FIG. 5 shows a seizure tester.

The copper-alloy sintered materials having the composition shown in Table 2 were produced by the same method as in Example 1. Seizure resistance of the resultant sintered materials was examined by a pin-on disc tester shown in FIG. 5. In FIG. 5, 5 is a hydralic cylinder, 6 is oil-feeding pads, 7 is a testing specimen, 8 is a disc, which is the opposite material of sliding, 9 is a balance weight which balances with the hydraulic cylinder, and 10 is a load cell.

The testing conditions were as follows.
(a) Sliding Speed: 15 m/sec
(b) Load: successively load increase (step mode), 600N/min
(c) Grade of Oil: 10W-30
(d) Temperature of Oil: Room Temperature
(e) Opposite Material: Quenched S55C (Hv=550–650), Roughness-0.5–0.8μm Rz
(f) Specimen: area-1 cm$^2$, roughness-0.1–1.5 μm Rz.
The testing results of seizure resistance are shown in Table 2.

TABLE 2

|  | No. | Cu | Ag | Sn | Pb | P | Seizure Test Seizure Load (kg/cm$^2$) |
|---|---|---|---|---|---|---|---|
| Examples | 11 | Bal | 0.1 | 3 | — | 0.03 | 860 |
|  | 12 | Bal | 1.0 | 5 | — | — | 900 |
|  | 13 | Bal | 2.0 | 10 | — | — | 830 |
|  | 14 | Bal | 0.5 | 5 | — | 0.05 | 880 |
|  | 15 | Bal | 1.5 | 1 | — | 0.01 | 850 |
| Comparative | 16 | Bal | — | — | — | — | 400 |
| Examples | 17 | Bal | 0.08 | — | — | — | 450 |
|  | 18 | Bal | — | 15 | — | — | 420 |
|  | 19 | Bal | 0.05 | 0.5 | — | — | 480 |
|  | 20 | Bal | — | 3.5 | 24 | 0.02 | 450 |
|  | 21 | Bal | 5 | 8 | — | 0.03 | 480 |

In Table 2, Comparative Example 20 is an example of representative compositions of a conventional kelmet. When compared with the performance of this comparative example, it is seen that the seizure resistance of the inventive Examples 11–15 is improved by slightly less than twice. It is noticeable that notwithstanding the non-inclusion of Pb in the materials of the inventive examples, the seizure resistance is improved.

The single addition of Ag (Comparative Example 17) and Sn (Comparative Example 18) improves the seizure resistance more than that of the pure copper (Comparative Example 16) but to a slight degree. When Ag and Sn are added in combination (Comparative Example 19), the seizure resistance is further improved. The degree of improvement is still slight since P is absent. In Comparative Example 21, since the Ag content is too high, the seizure resistance is not satisfactory.

EXAMPLE 3

The copper-based sliding-bearing materials having a composition shown in Table 3 were prepared by the same method as in Example 1. Sliding bearings for connecting-rod bearings of a Diesel engine equipped with a turbocharger (displacement –2400 cc) were manufactured. The backing metal used was a steel sheet (SPCC, thickness=1.2 mm). The thickness of lining was 0.3 mm. An overlay was directly deposited on the lining surface without the intermediary of an nickel barrier. The method for forming the overlay was a combination of electric plating with the aid of a borofluoride bath and the diffusion of In in the case of metallic overlay. A mixture of solid lubricant and resin is baked in the case of the solid-lubricant based overlay. The sliding properties of the respective sliding bearings were measured by the following method.

(a) Rotation number: 400 rpm
(b) Unit load of bearing: 40, 60, 70 Mpa
(c) Grade of oil: 10W-30, CD
(d) Temperature of oil: 125° C.
(e) Testing time: 400 h
Evaluation of test results: the wear amount was measured, and average value was calculated; the surface state: acceptable (O), if re-use is deemed possible under visual inspection, and failure (x), if the re-use is not possible.

TABLE 3

Results of Engine Test

|  |  | Lining Component (wt/%) |  |  |  |  | Ni Plating | Overlay Component (wt/%) |  |  |  | Surface Coating Material |  | Thickness of Overlay (μm) | Wear Amount (mg) |  |  | Surface State of Bearing After 400 h |
|---|---|---|---|---|---|---|---|---|---|---|---|---|---|---|---|---|---|---|
|  | No | Cu | Ag | Sn | Pb | P |  | Pb | Sn | In | Cu | Resin | Lubricant |  | 45 MPa | 60 MPa | 70 MPa |  |
| Examples | 22 | Bal | 0.1 | 1 | — | 0.03 | None | Bal | 10 |  | 2 | — | — | 5 | 27 | 33 | 38 | o |
|  | 23 | Bal | 1.0 | 5 | — | — | None | Bal | 10 | 10 | 2 | — | — | 10 | 40 | 44 | 49 | o |
|  | 24 | Bal | 1.0 | 1 | — | — | None | Bal | 10 | 10 | 2 | — | — | 3 | 21 | 25 | 32 | o |
|  | 25 | Bal | 1.0 | 5 | — | — | None | Bal | — | 10 | — | — | — | 5 | 30 | 35 | 41 | o |
|  | 26 | Bal | 2.0 | 10 | — | 0.05 | None | Bal | — | 10 | 2 | — | — | 25 | 50 | 59 | 64 | o |
|  | 27 | Bal | 2.0 | 1 | — | — | None | Bal | 10 | 10 | — | — | — | 5 | 25 | 34 | 39 | o |
|  | 28 | Bal | 2.0 | 5 | — | — | None | Bal | 10 | 10 | — | — | — | 1 | 12 | 20 | 29 | o |
|  | 29 | Bal | 2.0 | 3 | — | — | None | — | Bal | — | — | — | — | 5 | 23 | 33 | 40 | o |
|  | 30 | Bal | 2.0 | 10 | — | 0.1 | None |  |  |  |  | PI | MoS$_2$ | 5 | 18 | 25 | 33 | o |
|  | 31 | Bal | 2.0 | 7 | — | — | None |  |  |  |  | PAI | MoS$_2$ | 10 | 26 | 30 | 38 | o |
|  | 32 | Bal | 0.5 | 7 | — | 0.5 | None |  |  |  |  | Epoxy Resin | MoS$_2$ | 5 | 16 | 23 | 31 | o |
|  | 33 | Bal | 1.0 | 3 | — | — | None |  |  |  |  | PI | MoS$_2$ | 3 | 14 | 21 | 28 | o |
| Comparative Examples | 34 | Bal | — | 5 | 25 | — | None | Bal | — | 10 | — | — | — | 5 | Seizure at 310 h | Seizure at 170 h | Seizure at 100 h | x |
|  | 35 | Bal | 0.05 | 5 | — | — | None | Bal | 10 | 10 | — | — | — | 5 | Seizure at 150 h | Seizure at 100 h | Seizure at 70 h | x |

TABLE 3-continued

Results of Engine Test

| | Lining Component (wt/%) | | | | | Ni Plat- | Overlay Component (wt/%) | | | | Surface Coating Material | | Thick- ness of Overlay | Wear Amount (mg) | | | Surface State of Bearing |
|---|---|---|---|---|---|---|---|---|---|---|---|---|---|---|---|---|---|
| No | Cu | Ag | Sn | Pb | P | ing | Pb | Sn | In | Cu | Resin | Lubri- cant | (μm) | 45 MPa | 60 MPa | 70 MPa | After 400 h |
| 36 | Bal | 1.0 | 15 | | | None | Bal | 10 | 10 | — | — | — | 5 | Sei- zure at 70 h | Sei- zure at 50 h | Sei- zure at 30 h | x |
| 37 | Bal | 3.0 | — | | | None | Bal | 10 | 10 | — | — | — | 5 | Sei- zure at 100 h | Sei- zure at 80 h | Sei- zure at 50 h | x |

In Table 3, Comparative Example 34 is an ordinary kelmet bearing fitted with an overlay, the thickness of which is so thin as to only provide the compatibility. Seizure occurs under the present testing condition. In Comparative Example 35, in which a small amount (0.05%) of Ag is added, and Pb is removed, seizure becomes more likely to occur. In Comparative Example 36, in which the Ag content is further increased and a large amount of Sn is added, and in Comparative Example 36, in which only Ag is added in a large amount, seizure becomes somewhat less likely to occur.

Compared with these comparative examples, the inventive examples exhibit very small wear amount and improved seizure resistance. Particularly, the properties are improved, even if the Sn content is very small (Examples 22 and 24).

INDUSTRIAL APPLICABILITY

As is described hereinabove, the Cu—Sn—Ag based copper-alloy according to the present invention is characterized in the points that the seizure resistance required for the sliding bearing are greatly improved and, further, is free of lead, which causes the corrosion due to the degraded oil, or the lead addition amount is low.

The copper alloy having the present composition is conventionally known to be used as spring or contact material for electric parts (for example, Japanese Unexamined Patent Publication (Kokai) No. Sho 49-75,417, No. Sho 50-77,216, No. Hei 2-228,439, and No. Hei 5-195,173). The present inventive material, in which the Ag and Sn, which are forcedly solid-dissolved and then precipitate on the sliding surface during the use of a bearing, is remarkable as compared with the known materials from the point of view of metallographic structure control.

We claim:

1. A copper-based sliding bearing material having improved seizure resistance, consisting of, by weight percentage, from 0.1 to 2% of Ag, from 1 to 10% of Sn, and the balance consisting of Cu and unavoidable impurities, and, further said Ag and Sn do not essentially form secondary phases but are in complete or essentially solid-solution state in a Cu matrix.

2. A copper-based sliding bearing material according to claim 1, where the Ag content is from 0.4 to 1%.

3. A copper-based sliding bearing material according to claim 1, where the Sn content is from 2 to 7%.

4. A sliding bearing for an internal combustion engine which comprises copper-based sliding bearing material according to claim 1, and an overlay, having a thickness of from 1 to 25 μm, which consists of soft metal or solid lubricant and resin.

5. A sliding bearing for an internal combustion engine according to claim 4, wherein the thickness of the overlay is from 2–8 μm.

6. A sliding bearing for an internal combustion engine according to claim 4, wherein the overlay is directly bonded on the above-mentioned sliding bearing material without the intermediary of an intermediate layer.

7. A sliding bearing for an internal combustion engine according to claim 1, where said complete or essentially solid solution state is maintained except for a sliding surface with a shaft.

8. A copper-based sliding bearing material having improved seizure resistance, consisting of, by weight percentage, from 0.1 to 2% of Ag, from 1 to 10% of Sn, not more than 0.5% of P and the balance consisting of Cu and unavoidable impurities, and, further said Ag and Sn do not essentially form secondary phases but are in complete or essentially solid-solution state in a Cu matrix.

9. A copper-based sliding bearing material according to claim 8, where the Ag content is from 0.4 to 1%.

10. A copper-based sliding bearing material according to claim 8, where the Sn content is from 2 to 7%.

11. A copper-based sliding bearing material according to claim 8, where the P content is from 0.5 to 0.15%.

12. A sliding bearing for an internal combustion engine which comprises copper-based sliding material according to claim 8, and an overlay, having a thickness of from 1 to 25 μm, which consists of soft metal or solid lubricant and resin.

13. A sliding bearing for an internal combustion engine according to claim 12, wherein the thickness of the overlay is from 2–8 μm.

14. A sliding bearing for an internal combustion engine according to claim 12, wherein the overlay is directly bonded on the above-mentioned sliding bearing material without the intermediary of an intermediate layer.

15. A sliding bearing for an internal combustion engine according to claim 12, where said complete or essentially solid solution state is maintained except for a sliding surface with a shaft.

16. A copper-based sliding bearing material having improved seizure resistance, consisting of, by weight percentage, from 0.1 to 2% of Ag, from 1 to 10% of Sn, not more than 4% of at least one element selected from the group consisting of Pb and Bi, and the balance consisting of Cu and unavoidable impurities, and, further said Ag and Sn do not essentially form secondary phases but are in complete or essentially solid-solution state in a Cu matrix.

17. A copper-based sliding bearing material according to claim 16, where the Ag content is from 0.4 to 1%.

18. A copper-based sliding bearing material according to claim 16, where the Sn content is from 2 to 7%.

19. A sliding bearing for an internal combustion engine which comprises copper-based sliding material according to claim 16, and an overlay, having a thickness of from 1 to 25 μm, which consists of soft metal or solid lubricant and resin.

20. A sliding bearing for an internal combustion engine according to claim 19, wherein the thickness of the overlay is from 2–8 μm.

21. A sliding bearing for an internal combustion engine according to claim 19, wherein the overlay is directly bonded on the above-mentioned sliding bearing material without the intermediary of an intermediate layer.

22. A sliding bearing for an internal combustion engine according to claim 19, where said complete or essentially solid solution state is maintained except for a sliding surface with a shaft.

23. A copper-based sliding bearing material having improved seizure resistance, consisting of, by weight percentage, from 0.1 to 2% of Ag, from 1 to 10% of Sn, not more than 0.5% of P, not more than 4% of at least one element selected from the group consisting of Pb and Bi, and the balance consisting of Cu and unavoidable impurities, and, further said Ag and Sn do not essentially form secondary phases but are in complete or essentially solid-solution state in a Cu matrix.

24. A copper-based sliding bearing material according to claim 23, where the Ag content is from 0.4 to 1%.

25. A copper-based sliding bearing material according to claim 23, where the Sn content is from 2 to 7%.

26. A copper-based sliding bearing material according to claim 23, where the P content is from 0.5 to 0.15%.

27. A sliding bearing for an internal combustion engine which comprises copper-based sliding material according to claim 23, and an overlay, having a thickness of from 1 to 25 μm, which consists of soft metal or solid lubricant and resin.

28. A sliding bearing for an internal combustion engine according to claim 27, wherein the thickness of the overlay is from 2–8 μm.

29. A sliding bearing for an internal combustion engine according to claim 27, wherein the overlay is directly bonded on the above-mentioned sliding bearing material without the intermediary of an intermediate layer.

30. A sliding bearing for an internal combustion engine according to claim 27, where said complete or essentially solid solution state is maintained except for a sliding surface with a shaft.

* * * * *